(12) United States Patent
Irani et al.

(10) Patent No.: US 8,984,961 B2
(45) Date of Patent: Mar. 24, 2015

(54) PRESSURE DIFFERENTIAL FLOW METER INCLUDING A CONSTRICTION DEVICE THAT CAN CREATE MULTIPLE AREAS OF CONSTRICTION

(71) Applicant: Halliburton Energy Services, Inc., Houston, TX (US)

(72) Inventors: Cyrus A. Irani, Houston, TX (US); Jason D. Dykstra, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 192 days.

(21) Appl. No.: 13/766,549

(22) Filed: Feb. 13, 2013

(65) Prior Publication Data

US 2013/0213142 A1      Aug. 22, 2013

Related U.S. Application Data

(63) Continuation of application No. PCT/US2012/025890, filed on Feb. 21, 2012.

(51) Int. Cl.
| | | |
|---|---|---|
| *G01F 1/37* | (2006.01) | |
| *G01F 1/40* | (2006.01) | |
| *G01F 1/44* | (2006.01) | |

(52) U.S. Cl.
CPC ... *G01F 1/40* (2013.01); *G01F 1/44* (2013.01)
USPC ...................................................... 73/861.52

(58) Field of Classification Search
USPC ............... 73/861.52, 861.61, 861.63, 861.64, 73/861.55
See application file for complete search history.

(56) References Cited

U.S. PATENT DOCUMENTS

| | | | | |
|---|---|---|---|---|
| 5,554,805 | A * | 9/1996 | Bahrton | 73/202 |
| 5,814,738 | A * | 9/1998 | Pinkerton et al. | 73/861.55 |
| 5,861,561 | A * | 1/1999 | Van Cleve et al. | 73/861.52 |
| 6,352,001 | B1 * | 3/2002 | Wickert et al. | 73/861.52 |
| 7,337,678 | B2 * | 3/2008 | Thakre et al. | 73/861.52 |
| 7,461,537 | B2 * | 12/2008 | Bierl et al. | 73/1.26 |
| 7,832,283 | B2 * | 11/2010 | Peters et al. | 73/861.52 |
| 7,878,980 | B2 * | 2/2011 | Ricciardelli | 600/533 |
| 7,983,856 | B2 | 7/2011 | Boulanger et al. | |

\* cited by examiner

*Primary Examiner* — Jewel V Thompson
(74) *Attorney, Agent, or Firm* — John W. Wustenberg; Sheri Higgins Law; Sheri Higgins

(57) ABSTRACT

A pressure differential flow meter for determining the flow rate of a fluid comprises a constriction device, wherein the constriction device is capable of creating at least a first area of constriction and a second area of constriction having cross-sectional areas that are different, wherein the constriction device automatically moves from the first area of constriction to the second area of constriction when the pressure differential increases above or falls below a predetermined range, and wherein the pressure differential is based on the fluid velocity of the fluid flowing in the flow meter. A method of determining the flow rate of a fluid using the pressure differential flow meter comprises flowing the fluid through the flow meter.

21 Claims, 6 Drawing Sheets

US 8,984,961 B2

PRESSURE DIFFERENTIAL FLOW METER INCLUDING A CONSTRICTION DEVICE THAT CAN CREATE MULTIPLE AREAS OF CONSTRICTION

CROSS-REFERENCE TO RELATED APPLICATION

This application claims priority to PCT Application No. PCT/US12/25890, filed on Feb. 21, 2012.

TECHNICAL FIELD

A pressure differential flow meter includes a constriction device that is capable of creating at least a first area of constriction and a second area of constriction. The first area of constriction can be less than the second area of constriction. As the fluid velocity through the first area of constriction increases to about the maximum velocity of a first fluid velocity range, the constriction device can create the second area of constriction, and as the fluid velocity through the second area of constriction decreases to about the minimum velocity of a second fluid velocity range, the constriction device can create the first area of constriction. The constriction device can be designed to create multiple areas of constriction without having to remove and replace the flow meter or parts on the flow meter in order to create the multiple areas of constriction. Methods of using the flow meter are also provided. According to an embodiment, the flow meter is used in an oil or gas well.

SUMMARY

According to an embodiment, a pressure differential flow meter comprises: a constriction device, (A) wherein the constriction device is capable of creating at least a first area of constriction and a second area of constriction; (i) wherein the first area of constriction has a cross-sectional area that is less than the cross-sectional area of the second area of constriction; (ii) wherein the pressure differential is within a range when the fluid velocity flowing through the first area of constriction is within a first fluid velocity range; and (iii) wherein as the fluid velocity through the first area of constriction increases to about the maximum velocity of the first fluid velocity range, the constriction device creates the second area of constriction.

According to another embodiment, the pressure differential flow meter comprises: the constriction device, wherein the pressure differential is within a range when the fluid velocity flowing through the second area of constriction is within a second fluid velocity range; and wherein as the fluid velocity through the second area of constriction decreases to about the minimum velocity of the second fluid velocity range, the constriction device creates the first area of constriction.

According to another embodiment, a method of determining the flow rate of a fluid using the pressure differential flow meter comprises: flowing the fluid through the flow meter, wherein the flow meter comprises: (A) the constriction device, (i) wherein the constriction device is capable of creating at least a first area of constriction and a second area of constriction; (a) wherein the first area of constriction has a cross-sectional area that is less than the cross-sectional area of the second area of constriction; (b) wherein the pressure differential is within a range when the fluid velocity flowing through the first area of constriction is within a first fluid velocity range and when the fluid velocity flowing through the second area of constriction is within a second fluid velocity range; and (c) wherein as the fluid velocity through the first area of constriction increases to about the maximum velocity of the first fluid velocity range, the constriction device creates the second area of constriction; and (d) wherein as the fluid velocity through the second area of constriction decreases to about the minimum velocity of the second fluid velocity range, the constriction device creates the first area of constriction; and (B) a flow rate computing device.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1A:
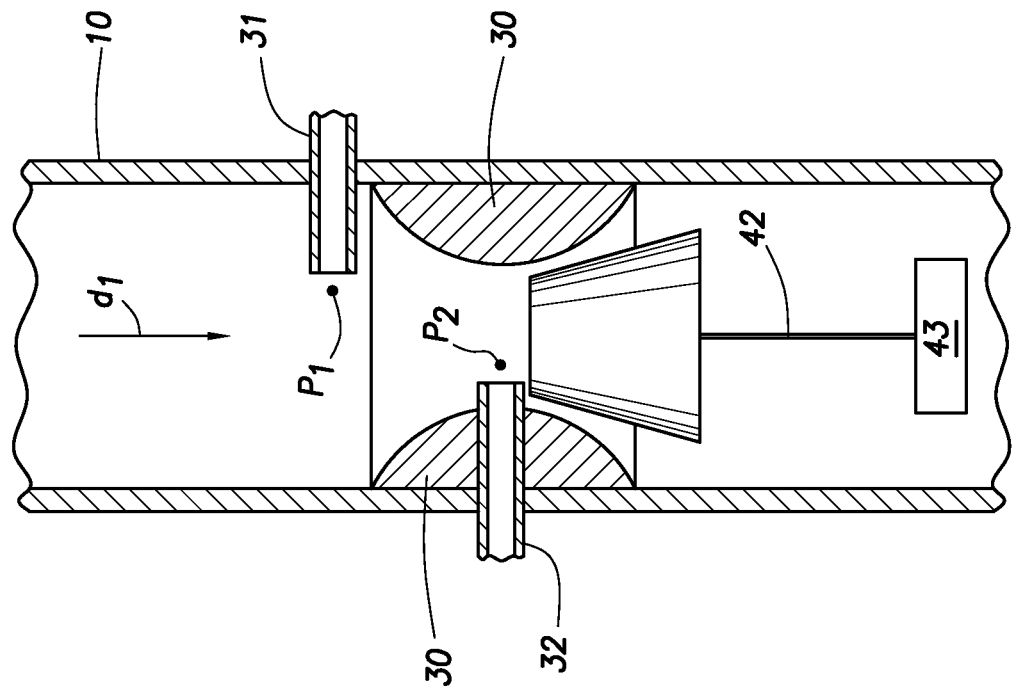
FIGS. 1A and 1B depict a pressure differential flow meter including a constriction device according to an embodiment.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more pressures, areas of constriction, etc., as the case may be, and does not indicate any sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas, or combinations thereof.

Flow meters can be used to determine the flow rate of a fluid flowing through a tube. The flow rate can be expressed in a variety of units, for example in units of mass or volume per unit of time. A volumetric flow meter can be used to determine the volumetric flow rate of a fluid, while a mass flow meter can be used to determine the mass flow rate of a fluid.

There are several different types of volumetric and mass flow meters. One example of a type of flow meter is called a pressure differential flow meter (PDFM). Pressure differential flow meters determine the flow rate of a fluid via a pressure drop across the flow meter. The pressure differential is created by introducing a constriction within the tube. A first pressure ($P_1$) can exist at a location upstream of the constriction and a second pressure ($P_2$) can exist at a location adjacent to the constriction. As used herein, the term "upstream" means closer to the fluid source and is in the opposite direction of the fluid flow. As used herein, the term "downstream" means farther away from the fluid source and is in the direction of the fluid flow. The pressure differential (ΔP) or pressure drop can be calculated by subtracting $P_2$ from $P_1$. There can also be a first velocity ($v_1$) at a location before the constriction and a second velocity ($v_2$) at a location adjacent to the constriction. According to the Venturi effect, the velocity of the fluid increases ($v_2$ increases) as the cross-sectional area of the tube decreases at the constriction point. As $v_2$ increases, $P_2$ decreases, and as $P_2$ decreases, the pressure differential increases.

A pressure differential flow meter generally includes two or more pressure sensors to determine $P_1$ and $P_2$. The ΔP can then be determined via a computer from the transmitted $P_1$ and $P_2$ values. Having determined the ΔP, the velocity (v), volumetric flow rate (Q), and/or the mass flow rate (W) of the fluid can then be determined using the following formulas:

$$v = k(\Delta P/\rho)^{0.5}$$

$$Q = k^* A (\Delta P/\rho)^{0.5}$$

$$W = k^* A (\Delta P^* \rho)^{0.5}$$

where k=the discharge coefficient of the fluid; A=the cross-sectional area of the tube's opening; and ρ=the density of the flowing fluid. The discharge coefficient k can be influenced by the Reynolds number (Re) and the beta ratio. The beta ratio is the ratio between the diameter of the constriction and the inner diameter (I.D.) of the tube. The Reynolds number can be calculated using the following equation:

$$Re = 3,160 * SG * Q/I.D. * \mu$$

where SG=the specific gravity of the fluid measured at 60° F. (15.6° C.); and μ=the viscosity of the fluid in units of centipoise.

Generally, the accuracy of a PDFM is dependent on operation of the flow meter within a calibrated range. For incompressible fluids, Bernoulli's equation, shown below, can be used to calculate the theoretical pressure drop across a PDFM system.

$$\Delta P = \rho/2 (v_2^2 - v_1^2)$$

Accordingly, the pressure drop across the system is proportional to the square of the flow rate. Using this relationship, 10% of full scale flow produces only 1% of full scale pressure differential. Therefore, for a flow meter having a 20% error for example, if the flow rate is at the low end of the flow range (10% or less), then the error can have a substantial impact on the pressure differential (+/−0.2 of 1). As such, PDFM are generally only operated within a 25% to 33% flow range.

There are several different constriction devices used in PDFMs, such as, orifice plates, flow tubes, flow nozzles, etc. The area of the constriction, which dictates $v_2$ of the fluid, $P_2$, and ΔP for each type of constriction device can vary. For example, one orifice plate can have one area of constriction; whereas, a different orifice plate can have a different area of constriction. Moreover, each area of constriction can be calibrated to operate within a desired accuracy range. In the event that $v_1$ drops below or increases above the calibrated range, the resulting flow rate of the fluid may not be accurate. In such cases, the constriction device or a part of the constriction device must be removed from the system and a different constriction device must be installed in the system in order for the results to be accurate. As such, multiple constriction devices or parts, each with its own unique area of constriction, are often kept on location in the event that it is necessary to switch out the device. This process can be quite costly, both in the time required to switch out the device or part and the expense associated with each device.

To prevent having to switch out devices or parts, multiple flow meters, each one having a unique area of constriction, can be used in parallel. However, the expense associated with having to purchase more than one flow meter is increased by running the flow meters in parallel. Also, the flow meters will cause pressure losses, which will be compounded with multiple sensors in series. Another disadvantage to some PDFMs is that the density of the fluid flowing through the system is not measured directly. Instead, the PDFM is designed and calibrated using a pre-determined value. If the density of the fluid actually flowing through the system is different from the pre-determined value, then the resulting flow rate can be in error.

Thus, there exists a need for a flow meter that can accurately determine the volumetric or mass flow rate of a fluid over multiple velocity ranges. It is desirable for the flow meter to be able to create at least two unique areas of constriction wherein each area of constriction has a different velocity range. It is also desirable for the flow meter to move from a first area of constriction to a second area of constriction without the need to switch out devices and without the need to place more than one device in the tube.

A novel pressure differential flow meter determines the volumetric or mass flow rate of a fluid using a constriction device that is capable of creating at least a first and a second area of constriction based on the velocity of the fluid entering the flow meter. According to an embodiment, the first and the second areas of constriction are calibrated to produce accurate readings over a first and a second fluid velocity range, respectively. The constriction device can move between the different areas of constriction without the need to switch out the constriction device and also without the need to use more than one constriction device, for example, in parallel.

According to an embodiment, a pressure differential flow meter comprises: a constriction device, (A) wherein the constriction device is capable of creating at least a first area of constriction and a second area of constriction; (i) wherein the first area of constriction has a cross-sectional area that is less than the cross-sectional area of the second area of constriction; (ii) wherein the pressure differential is within a range when the fluid velocity flowing through the first area of constriction is within a first fluid velocity range; and (iii) wherein as the fluid velocity through the first area of constriction increases to about the maximum velocity of the first fluid velocity range, the constriction device creates the second area of constriction.

According to another embodiment, the pressure differential flow meter comprises: the constriction device, wherein the pressure differential is within a range when the fluid velocity flowing through the second area of constriction is within a second fluid velocity range; and wherein as the fluid velocity through the second area of constriction decreases to about the minimum velocity of the second fluid velocity range, the constriction device creates the first area of constriction.

According to another embodiment, a method of determining the flow rate of a fluid using the pressure differential flow meter comprises: flowing the fluid through the flow meter, wherein the flow meter comprises: (A) the constriction device, (i) wherein the constriction device is capable of creating at least a first area of constriction and a second area of constriction; (a) wherein the first area of constriction has a cross-sectional area that is less than the cross-sectional area of the second area of constriction; (b) wherein the pressure differential is within a range when the fluid velocity flowing through the first area of constriction is within a first fluid velocity range and when the fluid velocity flowing through the second area of constriction is within a second fluid velocity range; and (c) wherein as the fluid velocity through the first area of constriction increases to about the maximum velocity of the first fluid velocity range, the constriction device creates the second area of constriction; and (d) wherein as the fluid velocity through the second area of constriction decreases to about the minimum velocity of the second fluid velocity range, the constriction device creates the first area of constriction; and (B) a flow rate computing device.

Any discussion of the embodiments regarding the flow meter is intended to apply to both, the apparatus embodiments and the method embodiments. Any discussion of a particular component of an embodiment (e.g., an expansion and retraction member) is meant to include the singular form of the component and also the plural form of the component, without the need to continually refer to the component in both the singular and plural form throughout. For example, if a discussion involves "the expansion and retraction member 46," it is to be understood that the discussion pertains to one member (singular) and two or more members elements (plural).

The flow meter and any component of the flow meter can be made from a variety of materials. Examples of suitable materials include, but are not limited to: metals, such as steel, aluminum, titanium, and nickel; alloys; plastics; composites, such as fiber reinforced phenolic; ceramics, such as tungsten carbide, boron carbide, synthetic diamond, or alumina; elastomers; and dissolvable materials. According to an embodiment, the material is selected such that it is resistant to corrosion, erosion, and/or pitting due to contact with the fluid.

Figure 1B:
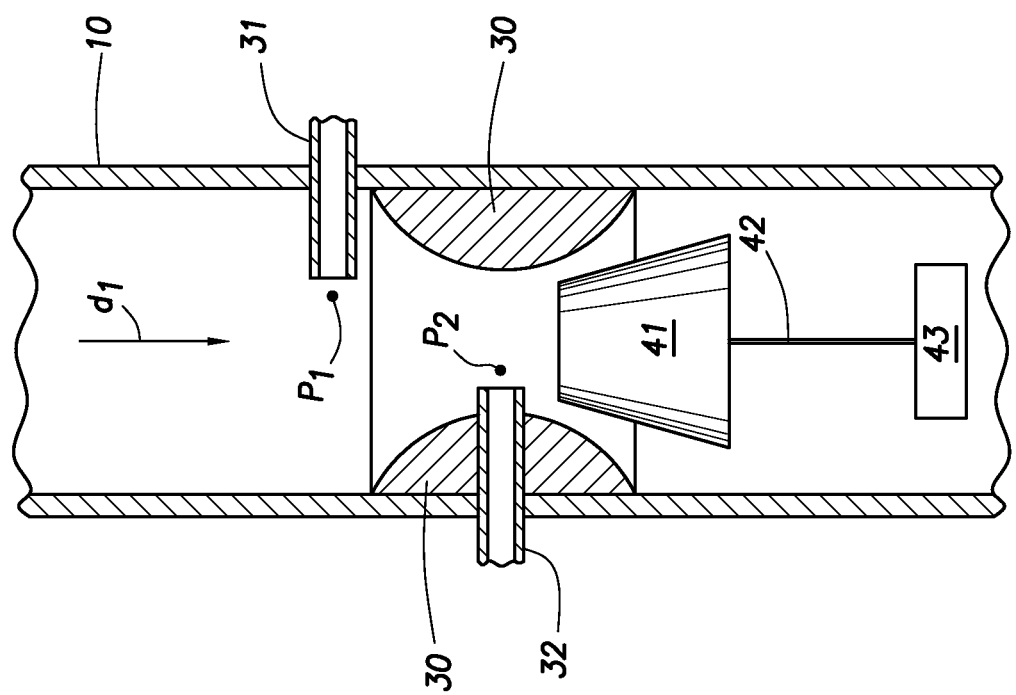

Turning to the Figures, FIG. 1 shows the flow meter according to an embodiment. The flow meter can be located within a tubular 10. The tubular 10 can have a certain cross-sectional area. The flow meter comprises a constriction device 41. According to an embodiment, the flow meter further comprises a throat 30. The throat 30 can be located upstream (not shown) or downstream (as seen in the Figures, for example, FIGS. 1A and 1B) of the constriction device 41. The throat 30 can be located inside the tubular 10. Preferably, the cross-sectional area of the throat 30 is less than the cross-sectional area of the tubular 10, e.g., the throat 30 reduces the cross-sectional area of the tubular 10 at the location of the throat 30. The throat 30 can have contoured edges, much like an O-ring, or straight edges (not shown), much like a square ring. According to an embodiment, if the throat 30 includes straight edges, then at least one of the straight-sided edges has an angle of greater than 90°. According to this embodiment, the straight-sided edge that has an angle of greater than 90° is positioned closest to the constriction device 41. According to another embodiment, the shape of the throat 30 and the shape of the constriction device 41 are designed to work in tandem to create the at least the first and the second areas of constriction. The throat 30 can be non-porous. In this manner, any fluid flowing through the tubular 10 does not flow through the throat 30, but rather is diverted into the smaller cross-sectional area where the throat 30 is located.

Figure 2:
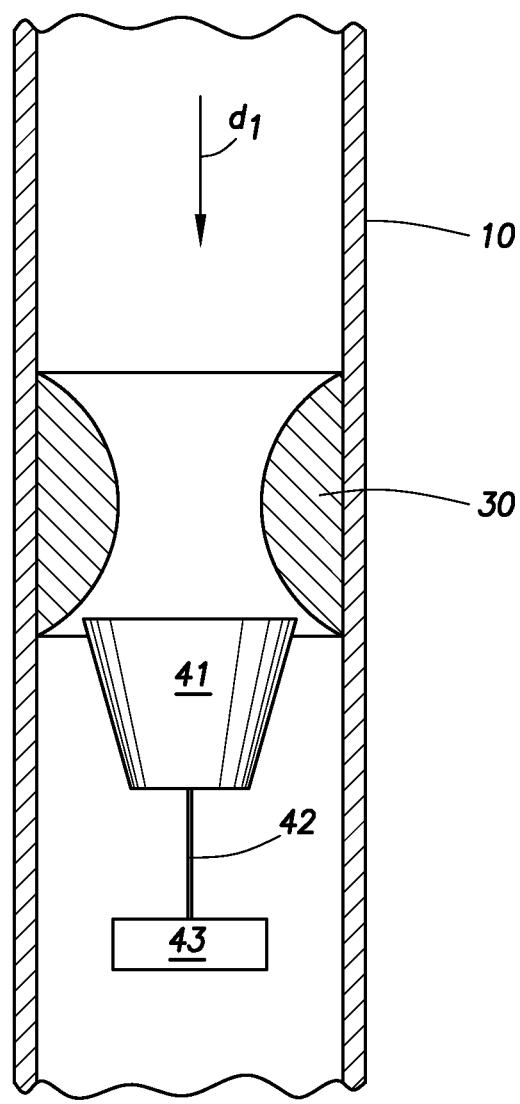
FIG. 2 illustrates the base of the constriction device facing upstream.

The flow meter includes the constriction device 41, wherein the constriction device is capable of creating at least a first area of constriction and a second area of constriction. As can be seen in FIGS. 1A, 1B, and 2, the first and second areas of constriction can be created by the constriction device 41 moving axially within the tubular 10, either upstream or downstream (wherein the direction of fluid flow is denoted in the Figures as $d_1$) within the tubular 10. The flow meter can further comprise a rod 42, wherein the rod 42 is connected to the constriction device 41. The rod 42 can be connected to the base of the constriction device 41 or to the area of a truncation plane. The rod 42 can be axially expandable and retractable.

The flow meter can further comprise a rod motor 43, wherein the rod 42 is connected to the rod motor 43. The rod 42 can be connected at one end to the constriction device 41 and connected to the rod motor 43 at the other end. According to an embodiment, the rod motor 43 is capable of causing an axial movement to the rod 42.

According to an embodiment, as the rod 42 axially expands, the constriction device 41 moves closer to the throat 30. In the case where the constriction device 41 is located downstream of the throat 30, the constriction device 41 will axially expand in an upstream direction to become positioned closer to the throat 30, as seen in FIG. 1B. In the case where the constriction device 41 is located upstream of the throat 30, the constriction device 41 will axially expand in a downstream direction to become positioned closer to the throat 30. According to an embodiment, the rod 42 axially expands and the constriction device 41 moves closer to the throat 30 to create the first area of constriction. According to this embodiment, as the constriction device 41 moves closer to the throat 30, the cross-sectional area of the area of constriction decreases.

According to another embodiment, as the rod 42 axially retracts, the constriction device 41 moves farther away from the throat 30. In the case where the constriction device 41 is located downstream of the throat 30, the constriction device 41 will axially retract in a downstream direction to become positioned farther away from the throat 30, as seen in FIG. 1A. In the case where the constriction device 41 is located upstream of the throat 30 (not shown), the constriction device 41 will axially retract in an upstream direction to become positioned farther away from the throat 30. According to an embodiment, the rod 42 axially retracts and the constriction device 41 moves farther away from the throat 30 to create the second area of constriction. According to this embodiment, as the constriction device 41 moves farther away from the throat 30, the cross-sectional area of the area of constriction increases.

The constriction device 41 can be solid or hollow. The constriction device 41 can be a variety of shapes. For example, the constriction device 41 can be conical, pyramidal, ellipsoidal, rectangular, or square in shape. According to an embodiment, the shape of the constriction device 41 is selected such that the constriction device 41 is capable of creating at least the first and second areas of constriction. The shape of the constriction device 41 can also be selected based on the shape of the throat 30 such that the constriction device 41 is capable of creating at least the first and second areas of constriction. By way of example, if the throat 30 has contoured edges, then the constriction device 41 may be conical-shaped. By way of another example, if the throat 30 has straight-sided edges, then the constriction device 41 may be pyramidal-shaped. For a conical- or pyramidal-shaped constriction device 41, the constriction device 41 can be a frustum. As used herein, the term "frustum" means a cone or pyramid wherein the apex of the cone or pyramid is truncated by a truncation plane that is parallel to the base of the cone or pyramid. The base of the constriction device 41 can be facing downstream (as depicted in FIGS. 1A and 1B) or upstream (as depicted in FIG. 2).

The flow meter can further comprise an anchor 50 for the constriction device 41. The anchor 50 can be used to help secure the constriction device 41 within the tubular 10 and prevent undesired axial or lateral movement of the constriction device 41. The flow meter can further comprise a guide (not shown) for the constriction device 41. The guide can help assist the constriction device 41 in moving to create at least the first and second areas of constriction.

FIGS. 3 through 5B depict the constriction device 41 according to other embodiments. As can be seen in these Figures, the constriction device 41 can comprise a conical- or pyramidal-shaped section. The constriction device 41 can be a frustum. The constriction device 41 can further comprise a support 45. The support 45 can be located at the truncation plane of the constriction device 41. The support 45 can be attached to the wall(s) of the constriction device 41.

Figure 3:
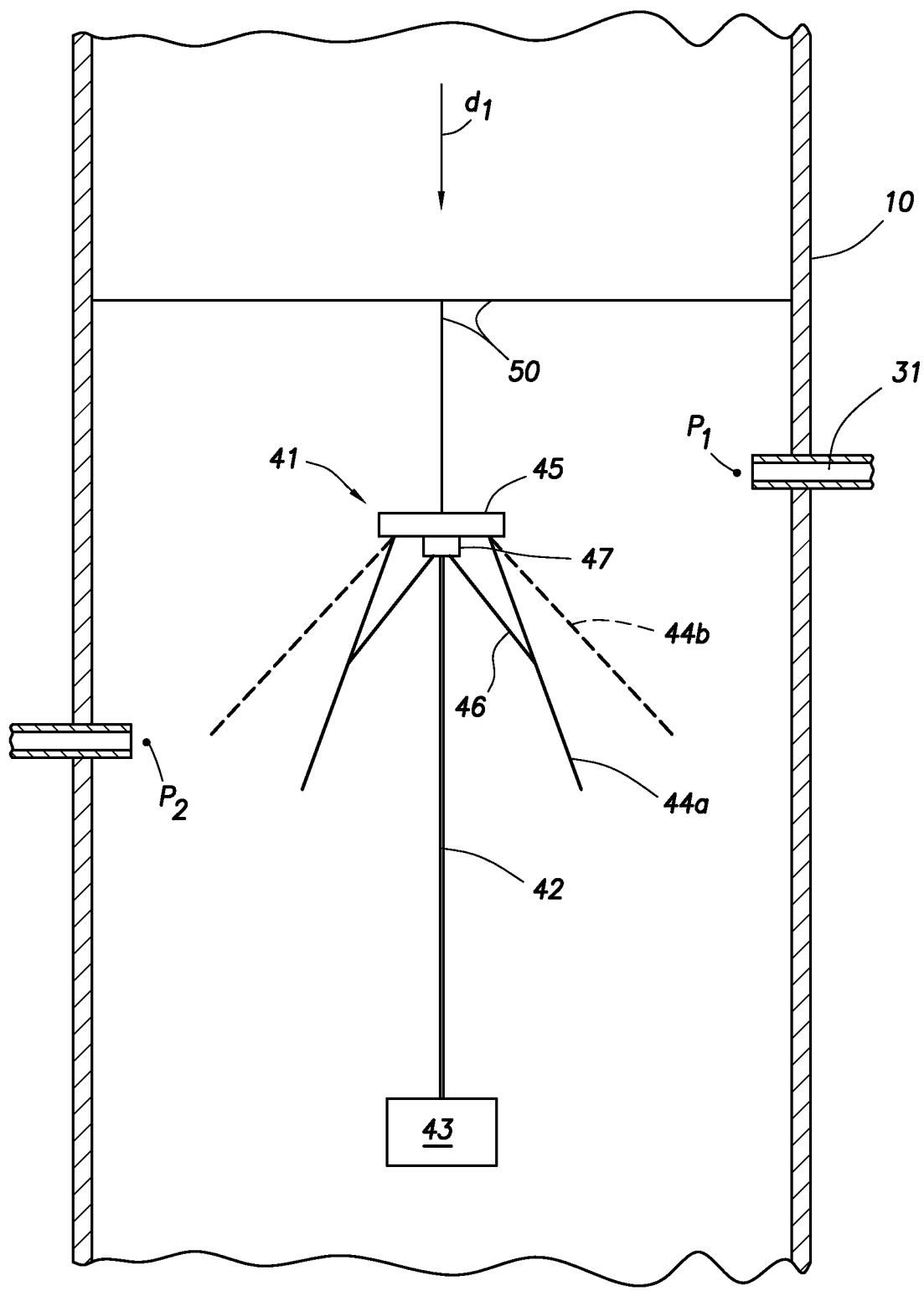
FIG. 3 depicts the constriction device according to another embodiment, wherein the constriction device can create a different area of constriction by increasing or decreasing the perimeter of the base of the constriction device.

The constriction device 41 is capable of creating at least the first and the second areas of constriction. According to an embodiment, the perimeter of the base of the constriction device 41 (the directrix if the constriction device 41 is conical-shaped) is capable of increasing and decreasing. The constriction device 41 can further include one or more expansion and retraction member 46 or a plate 48, and can also include a translational device 47. The translational device 47 can translate mechanical or rotational movement from the rod 42 to the expansion and retraction member 46 or the plate 48. By way of example, and as depicted in FIG. 3, the rod motor 43 can cause movement of the rod 42, which in turn imparts movement to the expansion and retraction member 46 via the translational device 47. The wall of the constriction device 41 is illustrated as being in the first area of constriction 44b. If the constriction device 41 needs to create the second area of constriction, then the expansion and retraction member 46 can retract via the translational device 47, the rod 42, and the rod motor 43. Upon retraction of the member 46, the perimeter of the base (directrix) decreases whereby the wall of the constriction device 41 is shown in the second area of constriction 44a. Of course the expansion and retraction member 46 can expand to move the constriction device 41 from the second area of constriction 44a to the first area of constriction 44b.

Figure 4:
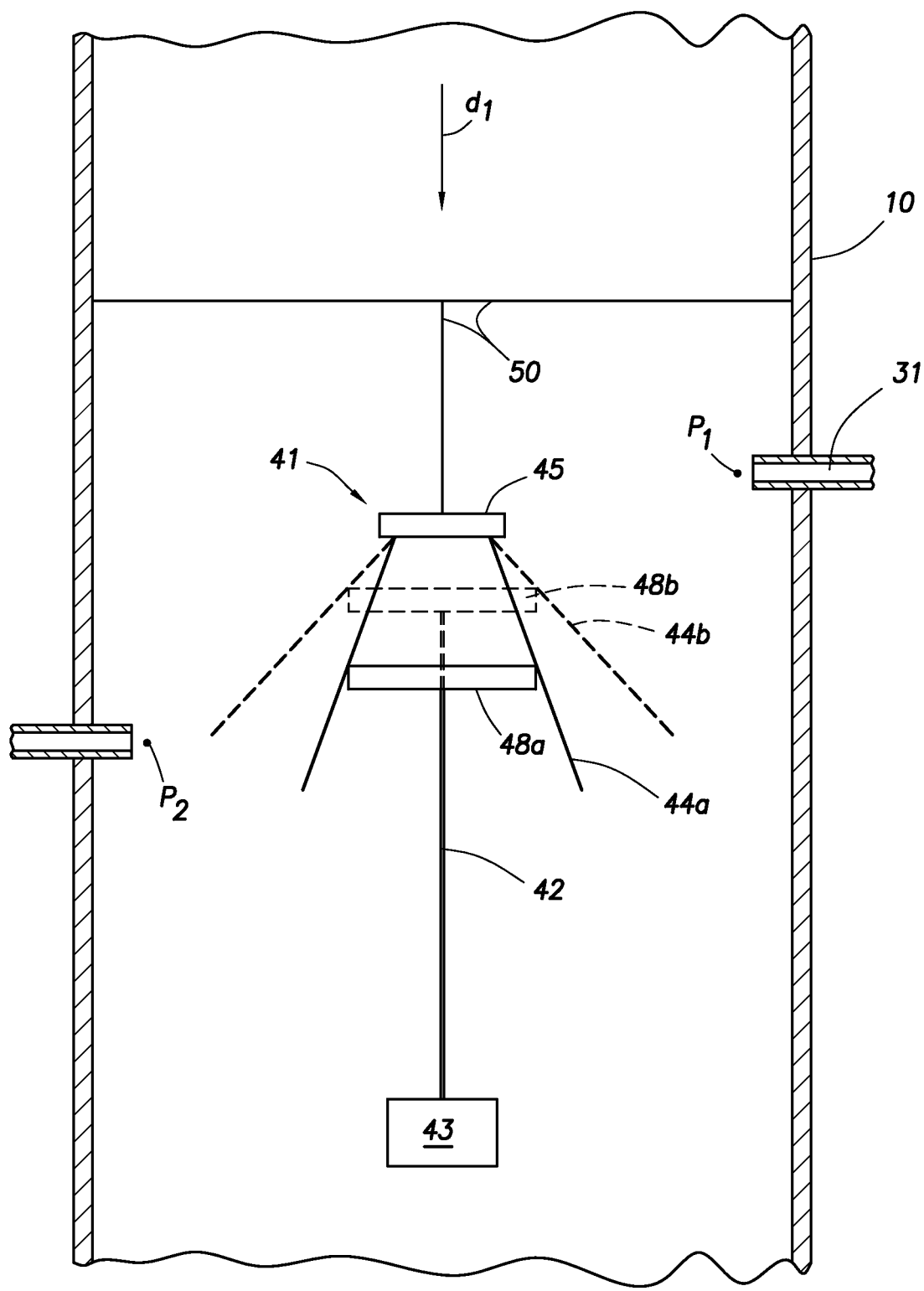
FIG. 4 depicts the constriction device of FIG. 3 according to another embodiment.

The flow meter can further include a plate 48. The perimeter of the base of the constriction device 41 can increase or decrease via the plate 48. As can be seen in FIG. 4, the base of the constriction device 41 is facing downstream. The plate 48 is attached to the rod 42. The plate 48 can move axially upstream or downstream via the rod 42 and the rod motor 43. Preferably, the plate 48 slidingly engages the inside wall of the constriction device 41. In this manner, as the plate 48 moves in an axial position, the wall of the constriction device 41 can move, thus increasing or decreasing the perimeter of the base. As shown in FIG. 4, the wall of the constriction device 41 can be in a second position 44a (creating the second area of constriction) and the plate can also be in a second position 48a. If the constriction device 41 needs to create the first area of constriction, then the rod 42 can cause the plate 48 to move in an upstream direction to a first location 48b, thus expanding the wall of the device to a first position 44b and thereby increasing the perimeter of the constriction device 41.

According to an embodiment, as the perimeter of the base of the constriction device 41 increases, the cross-sectional area of the area of constriction decreases. The perimeter of the base of the constriction device 41 can increase to create the first area of constriction. According to another embodiment, as the perimeter of the base of the constriction device 41 decreases, the cross-sectional area of the area of constriction increases. The perimeter of the base of the constriction device 41 can decrease to create the second area of constriction.

Figure 5A:
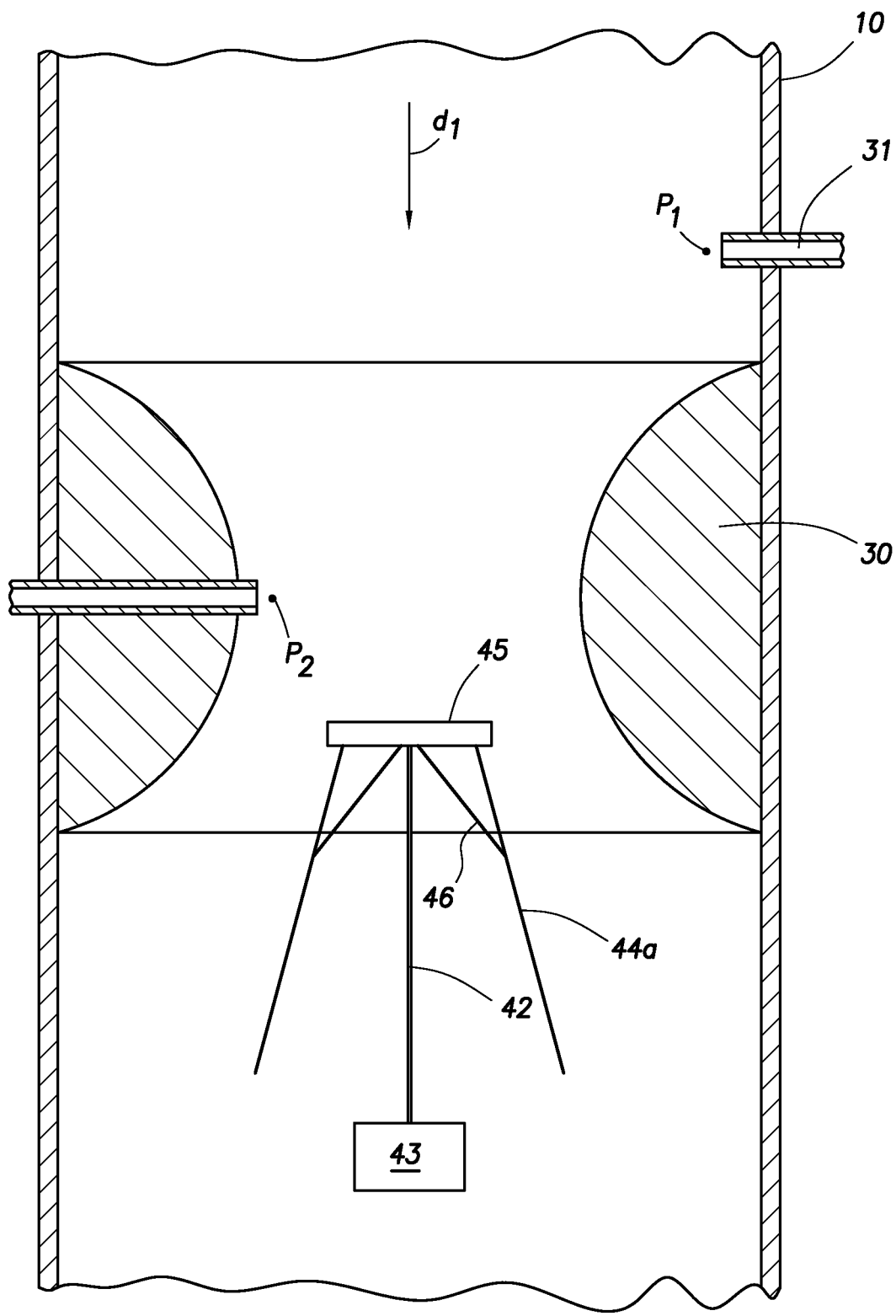
FIGS. 5A and 5B depict the pressure differential flow meter including the constriction device according to another embodiment.
Figure 5B:
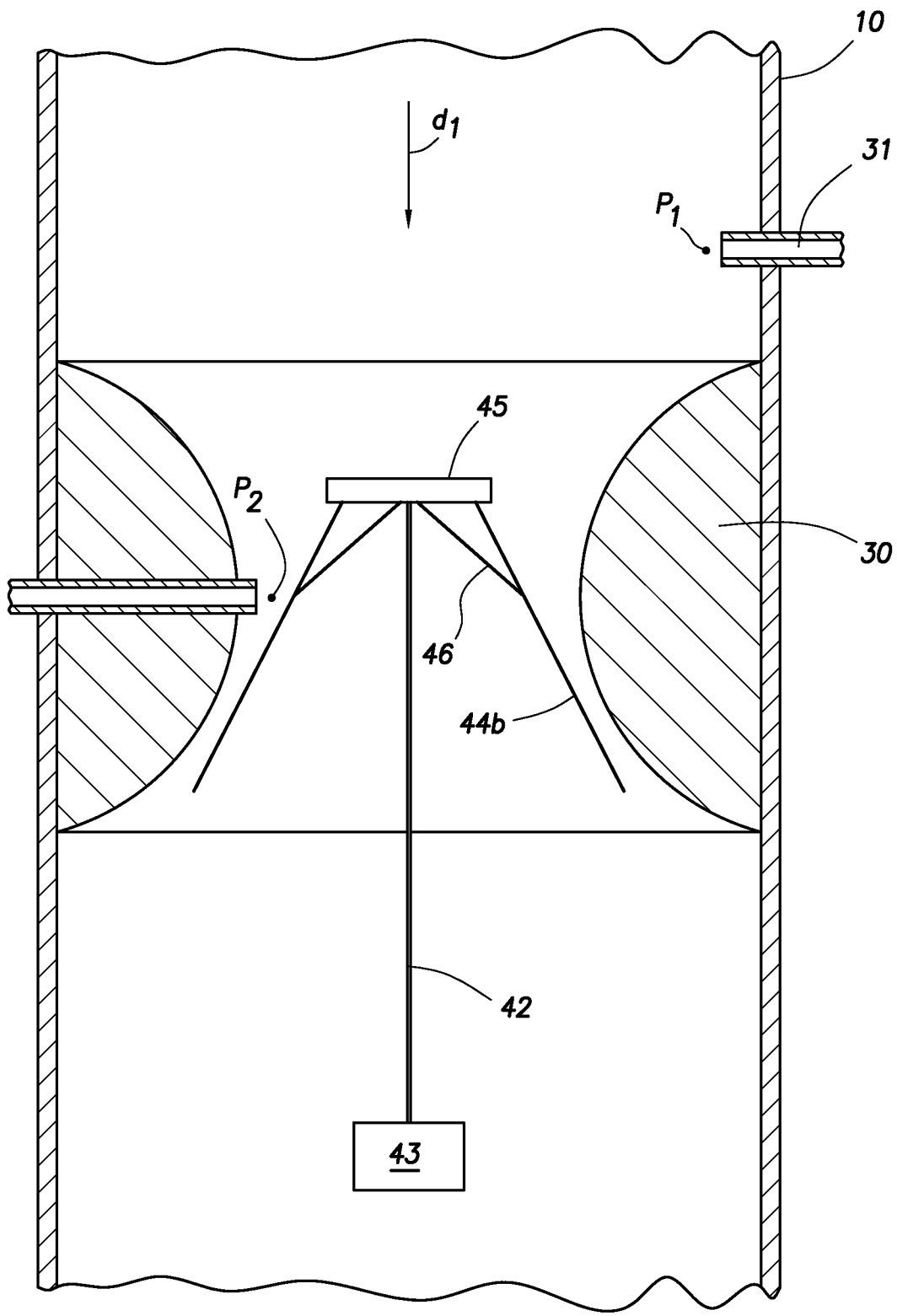

According to an embodiment, as depicted in FIGS. 5A and 5B, the constriction device 41 can both: move axially upstream and downstream closer to or farther away from the throat 30; and the wall of the constriction device 41 can move in a lateral direction to increase or decrease the perimeter of the base of the constriction device 41. FIG. 5A depicts the constriction device 41 creating the second area of constriction. FIG. 5B depicts the constriction device 41 creating the first area of constriction.

The flow meter can further comprise a first pressure sensor 31, wherein the first pressure sensor 31 is positioned inside the tubular 10 at a location upstream of the constriction device 41. The flow meter can further comprise a second pressure sensor 32, wherein the second pressure sensor 32 is positioned inside the tubular 10 at a location adjacent to the area of constriction. The first pressure sensor 31 can detect a first pressure $P_1$ at the location of the first pressure sensor 31 and the second pressure sensor 32 can detect a second pressure $P_2$ at the location of the second pressure sensor 32. The flow meter can further comprise a pressure transmitter and a pressure receiver (not shown), wherein the pressure transmitter transmits the first and second pressure signals from the first and second pressure sensors 31/32 to the pressure receiver.

The first area of constriction has a cross-sectional area that is less than the cross-sectional area of the second area of constriction. The pressure differential $\Delta P$ (i.e., the second pressure $P_2$ subtracted from the first pressure $P_1$) is within a range when the fluid velocity flowing through the first area of constriction is within a first fluid velocity range. There can be a first fluid velocity ($v_1$) (at a location upstream of the area of constriction), and there can be a second fluid velocity ($v_2$) adjacent to the area of constriction. According to the Venturi effect, the second fluid velocity ($v_2$) will be greater than the first fluid velocity ($v_1$) due to the cross-sectional area of the area of constriction being less than the cross-sectional area of the tubular 10. Consequently, the second pressure $P_2$ will be less than the first pressure $P_1$, and there will be a positive pressure differential $\Delta P$.

As the velocity of the fluid flowing through the first area of constriction increases to about (i.e., +/−10%) the maximum velocity of the first fluid velocity range, the constriction device 41 creates the second area of constriction. For example, as the first fluid velocity ($v_1$) increases, the second pressure $P_2$ decreases and the pressure differential $\Delta P$ increases. The constriction device 41 can be calibrated such that when the pressure differential $\Delta P$ increases to about the maximum calibrated range, then the constriction device 41 can create the second area of constriction. Because the cross-sectional area of the second area of constriction is greater than the first area of constriction, the second pressure $P_2$ will decrease, thus causing a decrease of the pressure differential $\Delta P$. This decrease in the pressure differential $\Delta P$ can decrease the pressure differential to within the calibrated range.

Moreover, the second area of constriction can be calibrated to operate within a second fluid velocity range. The maximum end of the first fluid velocity range can overlap with the minimum end of the second fluid velocity range.

The following are some examples in which the constriction device 41 can create the second area of constriction. These examples are not the only examples that could be given and are not intended to limit the means by which the constriction device 41 can create the second area of constriction. By way of example, if the constriction device 41 needs to create the second area of constriction, then the constriction device 41 can move farther downstream away from the throat 30. This downstream movement will create a greater cross-sectional area compared to the cross-sectional area of the first area of constriction. By way of another example, the wall of the constriction device 44 can laterally move to decrease the perimeter of the base of the constriction device 41 via, for example, the expansion and retraction member 46 or the plate 48. The decrease in the perimeter of the base of the constriction device 41 will create a greater cross-sectional area compared to the cross-sectional area of the first area of constriction. By way of yet another example, the constriction device 41 can both, move farther downstream away from the throat 30 and the perimeter of the base of the constriction device 41 can be decreased.

According to another embodiment, the pressure differential ΔP is within a range when the fluid velocity flowing through the second area of constriction is within a second fluid velocity range. As the fluid velocity through the second area of constriction decreases to about the minimum velocity of the second fluid velocity range, the constriction device 41 can move to create the first area of constriction. For example, as the first fluid velocity ($v_1$) decreases, the second fluid velocity ($v_2$) correspondingly decreases, and the pressure differential ΔP decreases. The constriction device 41 can be calibrated such that when the pressure differential ΔP decreases to about the minimum calibrated range, then the constriction device 41 can create the first area of constriction. Because the cross-sectional area of the first area of constriction is less than the cross-sectional area of the second area of constriction, the second fluid velocity ($v_2$) will now increase and the second pressure $P_2$ will decrease, thus causing an increase in the pressure differential ΔP. This increase in the pressure differential ΔP can increase the pressure differential to within the calibrated range. As stated above, the maximum end of the first fluid velocity range can overlap with the minimum end of the second fluid velocity range.

The following are some examples in which the constriction device 41 can create the first area of constriction. These examples are not the only examples that could be given and are not intended to limit the means by which the constriction device 41 can create the first area of constriction. By way of example, if the constriction device 41 needs to create the first area of constriction, then the constriction device 41 can move axially further upstream towards the throat 30. This upstream movement will create a cross-sectional area that is less than the cross-sectional area of the second area of constriction. By way of another example, the wall of the constriction device 44 can laterally move to increase the perimeter of the base of the constriction device 41 via, for example, the expansion and retraction member 46 or the plate 48. The increase in the perimeter of the base of the constriction device 41 will create a smaller cross-sectional area compared to the cross-sectional area of the second area of constriction. By way of yet another example, the constriction device 41 can both, move upstream towards the throat 30 and the perimeter of the base of the constriction device 41 can be increased.

The creation of at least the first and/or second areas of constriction can occur by a variety of means. By way of example, the flow meter can be designed such that should the velocity of the fluid flowing through a given constriction area cause the pressure differential ΔP to be outside of a calibrated range (either above or below the range), then an alarm can signal the too high or too low pressure differential ΔP. The alarm can be a sound or a blinking light, or a variety of other signals that can alert a worker present at the worksite that the constriction device 41 needs to move to another area of constriction. The worker can then manually move the constriction device 41 from one area of constriction to another by adjusting the rod 42 via the rod motor 43 and/or the translational device 47.

By way of another example, the flow meter can be designed to further include a mechanical control system (not shown). The mechanical control system can be designed to automatically move the constriction device 41 from one area of constriction to another based on the transmitted pressure differential. The mechanical control system can move the constriction device to create the next area of constriction, for example, by causing movement of the rod 42.

According to an embodiment, a pressure differential ΔP range is selected for each area of constriction. The pressure differential ΔP range for each area of constriction (i.e., the first, second, third, etc. areas of constriction) can be the same. According to an embodiment, the pressure differential ΔP range for each area of constriction is selected such that the flow meter has a reduced error and is operated in a relatively linear range (i.e., the slope of the pressure differential to flow rate is relatively constant). The accuracy of the measurement can be influenced by the Reynolds number (Re) and the beta ratio. According to another embodiment, the pressure differential ΔP range for each area of constriction is selected based on the Reynolds number and the beta ratio. One way to create a relatively linear range is to operate the device within a given flow range. By way of example, as the flow range becomes closer to the median flow range, the slope becomes more constant. The pressure differential ΔP range for each area of constriction can also be selected such that the flow range is in the range of about 10% to about 90%, preferably about 20% to about 80%, more preferably about 25% to about 60%.

The constriction device 41 can be capable of creating three or more areas of constriction. For example, the constriction device 41 can be capable of creating a third, fourth, etc. areas of constriction. The cross-sectional area of the second area of constriction can be less than the cross-sectional area of the third area of constriction; and the cross-sectional area of the third area of constriction can be less than the cross-sectional area of the fourth area of constriction, and so on. Each area of constriction can be designed such that the pressure differential ΔP is within a certain range when the fluid velocity flowing through that specific area of constriction is within a corresponding fluid velocity range (i.e., a third fluid velocity range, a fourth fluid velocity range, etc.).

It is to be understood that the specific fluid velocity range for a corresponding area of constriction can vary, and the specific fluid velocity range for each area of constriction can be pre-determined. Moreover, the maximum fluid velocity range of one area of constriction can overlap with the minimum fluid velocity range of the next ascending area of constriction. For example, the maximum fluid velocity range for the second area of constriction can overlap with the minimum fluid velocity range for the third area of constriction; the maximum for the third can overlap with the minimum for the fourth, and so on. In this manner, as the fluid velocity nears the maximum or minimum for a given range, the constriction device can create the next appropriate area of constriction (depending on whether the pressure differential ΔP is too high or too low). In this manner, the flow meter can operate within a pre-determined pressure differential range for optimal performance. If the constriction device 41 is capable of creating more than two areas of constriction, then the constriction device 41 can create the different areas of constriction according to the principles discussed above. For example, in the preceding discussions, one can replace the phrase "the first area of constriction" everywhere that phrase was used with "the second area of constriction" and also replace the phrase "the second area of constriction" everywhere that phrase was used with "the third area of constriction", such that the cross-sectional area of the second area of constriction is less than the cross-sectional area of the third area of constriction.

The increase or decrease in the cross-sectional areas for two particular areas of constriction can be a discreet difference. If the difference in the cross-sectional areas of constriction is discreet, then more areas of constriction might be required in order to accommodate a wide variation in flow velocities. Conversely, fewer areas of constriction may be needed in order to accommodate the variations in flow velocities when the difference in cross-sectional areas is not so discreet.

The flow meter can further comprise a flow rate computing device (not shown). The flow rate computing device can be a device, such as a computer, that is capable of reporting at least one flow rate of the fluid flowing through the flow meter. The at least one flow rate can be the volumetric flow rate or the mass flow rate of the fluid. The flow rate computing device can also report more than one flow rate of the fluid (e.g., both the volumetric and mass flow rate). The flow meter can also further comprise a density sensor (not shown). The density sensor can detect the density of the fluid flowing through the flow meter. The density of the fluid can be transmitted to the flow rate computing device to allow the computing device to report one or more flow rates of the fluid.

According to another embodiment, a method of determining the flow rate of a fluid using the pressure differential flow meter comprises: flowing the fluid through the flow meter. The methods can further include the step of positioning the flow meter in the tubular 10. The flow meter can be used in a variety of applications. The flow meter may be useful in applications where fluctuations in the velocity of the fluid would require switching out traditional flow meters or flow meter parts in order to provide accurate measurements.

According to an embodiment, the flow meter is used in a portion of a well. A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, openhole portion of the wellbore. A near-wellbore region is the subterranean material and rock of the subterranean formation surrounding the wellbore. As used herein, a "well" also includes the near-wellbore region.

More than one flow meter can be used to determine the flow rate of a fluid. For example, a first flow meter can be positioned in one location and a second flow meter can be positioned at a different location. The methods can further include the step of positioning two or more flow meters in two or more tubulars and flowing a fluid through the two or more flow meters.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within that range are specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A pressure differential flow meter comprising:
    a constriction device,
        (A) wherein the constriction device is capable of creating at least a first area of constriction and a second area of constriction;
            (i) wherein the first area of constriction has a cross-sectional area that is less than the cross-sectional area of the second area of constriction;
            (ii) wherein the pressure differential is within a range when the fluid velocity flowing through the first area of constriction is within a first fluid velocity range; and
            (iii) wherein as the fluid velocity through the first area of constriction increases to about the maximum velocity of the first fluid velocity range, the constriction device creates the second area of constriction; and
        (B) wherein at least a portion of the constriction device moves to create the first area of constriction and the second area of constriction.

2. The flow meter according to claim 1, wherein the flow meter further comprises a throat.

3. The flow meter according to claim 2, wherein the throat is located inside a tubular.

4. The flow meter according to claim 3, wherein the cross-sectional area of the throat is less than the cross-sectional area of the tubular.

5. The flow meter according to claim 4, wherein the first and second areas of constriction are created by the constriction device moving axially within the tubular.

6. The flow meter according to claim 5, wherein the constriction device moves axially closer to the throat to create the first area of constriction.

7. The flow meter according to claim 5, wherein the constriction device moves axially farther away from the throat to create the second area of constriction.

8. The flow meter according to claim 1, wherein the constriction device comprise a conical- or pyramidal-shaped section.

9. The flow meter according to claim 8, wherein the perimeter of the base of the constriction device is capable of increasing and decreasing.

10. The flow meter according to claim 9, wherein the perimeter of the base of the constriction device increases to create the first area of constriction.

11. The flow meter according to claim 9, wherein the perimeter of the base of the constriction device decreases to create the second area of constriction.

12. The flow meter according to claim 1, further comprising a first pressure sensor, wherein the first pressure sensor is positioned upstream of the constriction device.

13. The flow meter according to claim 1, further comprising a second pressure sensor, wherein the second pressure sensor is positioned adjacent to the area of constriction.

14. The flow meter according to claim 1, wherein the constriction device is capable of creating three or more areas of constriction.

15. The flow meter according to claim 14, wherein the constriction device is capable of creating a third area of constriction, and wherein the cross-sectional area of the second area of constriction is less than the cross-sectional area of the third area of constriction.

16. The flow meter according to claim 15, wherein the constriction device is capable of creating a fourth area of constriction, and wherein the cross-sectional area of the third area of constriction is less than the cross-sectional area of the fourth area of constriction.

17. The flow meter according to claim 1, further comprising a flow rate computing device.

18. The flow meter according to claim 17, wherein the flow rate computing device is capable of reporting at least one flow rate of the fluid flowing through the flow meter.

19. The flow meter according to claim 18, wherein the at least one flow rate of the fluid is the volumetric flow rate or the mass flow rate of the fluid.

20. A pressure differential flow meter comprising:
a constriction device,
(A) wherein the constriction device is capable of creating at least a first area of constriction and a second area of constriction;
  (i) wherein the first area of constriction has a cross-sectional area that is less than the cross-sectional area of the second area of constriction;
  (ii) wherein the pressure differential is within a range when the fluid velocity flowing through the second area of constriction is within a second fluid velocity range; and
  (iii) wherein as the fluid velocity through the second area of constriction decreases to about the minimum velocity of the second fluid velocity range, the constriction device creates the first area of constriction; and
(B) wherein at least a portion of the constriction device moves to create the first area of constriction and the second area of constriction.

21. A method of determining the flow rate of a fluid using a pressure differential flow meter comprising:
flowing the fluid through the flow meter, wherein the flow meter comprises:
(A) a constriction device,
  (i) wherein the constriction device is capable of creating at least a first area of constriction and a second area of constriction;
    (a) wherein the first area of constriction has a cross-sectional area that is less than the cross-sectional area of the second area of constriction;
    (b) wherein the pressure differential is within a range when the fluid velocity flowing through the first area of constriction is within a first fluid velocity range and when the fluid velocity flowing through the second area of constriction is within a second fluid velocity range;
    (c) wherein as the fluid velocity through the first area of constriction increases to about the maximum velocity of the first fluid velocity range, the constriction device creates the second area of constriction; and
    (d) wherein as the fluid velocity through the second area of constriction decreases to about the minimum velocity of the second fluid velocity range, the constriction device creates the first area of constriction; and
  (ii) wherein at least a portion of the constriction device moves to create the first area of constriction and the second area of constriction; and
(B) a flow rate computing device.

\* \* \* \* \*